E. LUDEKE.
FASTENING DEVICE.
APPLICATION FILED JUNE 7, 1917.

1,274,064.

Patented July 30, 1918.

INVENTOR
Emil Ludeke
BY
his ATTORNEYS

Witnesses
Nelson H. Copp
George D. Powell

UNITED STATES PATENT OFFICE.

EMIL LUDEKE, OF ROCHESTER, NEW YORK.

FASTENING DEVICE.

1,274,064.             Specification of Letters Patent.      Patented July 30, 1918.

Application filed June 7, 1917. Serial No. 173,280.

*To all whom it may concern:*

Be it known that I, EMIL LUDEKE, of the city of Rochester, county of Monroe, and State of New York, have invented certain new and useful Improvements in Fastening Devices; and I do hereby declare the following to be a full, clear, and exact description of the same, reference being had to the accompanying drawings, forming a part of this specification, and to the reference characters marked thereon.

My invention has for its object the provision of a novel form of fastening device in the nature of a separable fastener susceptible of various uses where it is desirable to temporarily secure together two or more sections or laps of material or for holding a flexible sheet of material in place upon a stationary back or frame, as for instance in the attaching of automobile curtains or similar removable parts of a vehicle. A further purpose of the improvement is to afford a simple device having few parts, rendering low the cost of manufacture, and greatly increasing the efficacy and durability of the structure. To these and other ends the invention consists in certain improvements and combinations of parts, all as will be hereinafter more fully described, the novel features being pointed out in the claims at the end of the specification.

In the drawings.

Similar reference characters throughout the several views indicate the same parts.

Figure 3:
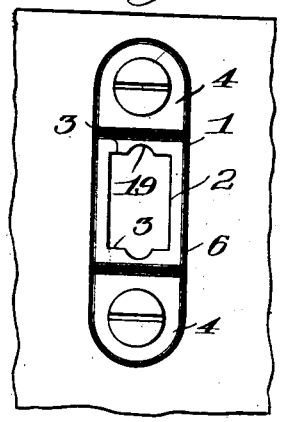
Fig. 3 is a plan view of the other coöperating separable member.

The structure which I am about to describe is illustrative of the invention in its application to vehicle curtain fasteners, but it will be understood that the invention is not to be limited or confined to any of the structural details herein shown, as it is applicable in a variety of ways, wherever it is necessary to detachably secure one part to another. In the present structure, drawings of which are enlarged to about twice the actual size in order to afford a full understanding of the relation and operation of the parts, 1 designates generally one of the separable members of the fastener which is recessed centrally at 2, affording locking shoulders 3 which are oppositely disposed preferably in parallel relation and engage the retaining members to be described presently. The part just described also includes lugs 4 at its opposite ends by which it is attached to the curtain section or other part with which it is used, as usual in this class of structures. The central portion of the member 1 is arranged outwardly from the lugs 5 and connected by the outwardly bent portions 6, thus affording the necessary space within the recess 2 for housing the retaining members of the other coöperating member of the fastener, as shown in Fig. 4.

Figure 1:
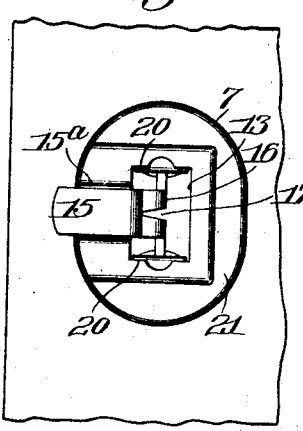
Figure 1 is a plan view illustrating one of the separable members, according to a preferred embodiment of the invention and showing the actuating lever in locked position.
Figure 2:
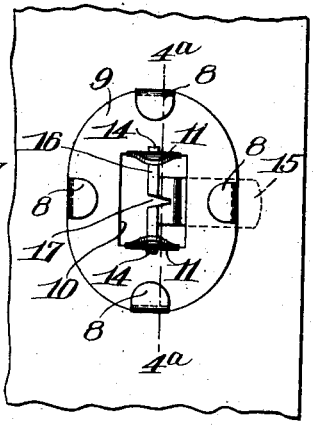
Fig. 2 is a bottom plan view of the same.
Figures 4, 6:
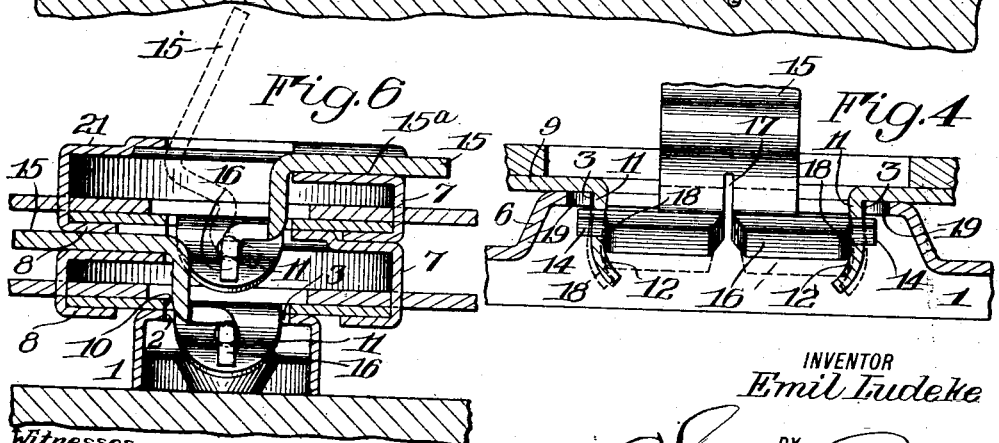
Fig. 4 is a sectional view on the line 4ᵃ—4ᵃ of Fig. 2, showing the actuator lever in released position in full lines and in locking position in dotted lines.
Fig. 6 is a sectional view on the line 6ᵃ—6ᵃ of Fig. 5, with the actuating lever of the outermost fastener released.

The other of the two coöperating separable members is shown in Figs. 1, 2 and 4, and comprises an outer plate 7 having lugs 8 which extend through the fabric to which the device is attached and overlie, on the underside, a plate 9. The latter is cutaway at its central portion, as indicated by 10, and is provided at opposite sides of said opening with the outwardly bent lugs 11. The said lugs 11 constitute the retaining members which engage the aforesaid locking shoulders 3 to hold the parts together, and to this end they are preferably formed integral with the plate 9 and are slightly resilient, their inner or base portions extending slightly away from each other so as to readily lock against the shoulders 3 when spread, and their outer portions or ends being bent toward each other and affording cam faces 12 by means of which they are spread apart into locking position, as will appear presently. The outer plate 7 is also recessed centrally at 13 to receive the actuating lever which extends through said opening and the aforementioned opening 10 of the inner plate 9 so as to be operable for spreading the retaining lugs 11. The actuating lever embodies trunnions 14 engaging openings in the lugs 11 for pivotal movement thereon, while 15 designates a finger piece by which the lever is operated and which when in normal or locked position extends in the plane of the outer face of the plate 7 and lies in a depression or recess 15 formed in the plate for this purpose. The actuating lever includes cam surfaces for engagement with the resilient locking lugs and to this end it is provided with an extension or projecting flange 16, which is preferably bifurcated or cut away at 17, whereby its ends are slightly yieldable toward each other. The projecting flange 16 has at its outer ends cam surfaces or edges 18 which engage the cam faces 12 on the lugs when the lever is swung about its axis, moving the outer portions of the resilient lugs from the position shown in full lines in Fig. 4 to the position shown in dotted lines. This action causes the lugs 11 to bite against and slightly overlie the locking shoulders 3 of the coöperating member, thereby holding the two members together. The actuating lever is held in locking position by frictional engagement, and to release the parts, the finger piece 15 is moved outwardly to the position shown in full lines in Fig. 4 and in dotted lines in Fig. 6. The separable member 1 is provided with cutaway portions or recesses 19 to accommodate the ends of the trunnions 14 in positioning the parts, as will appear from Fig. 4.

Figure 5:
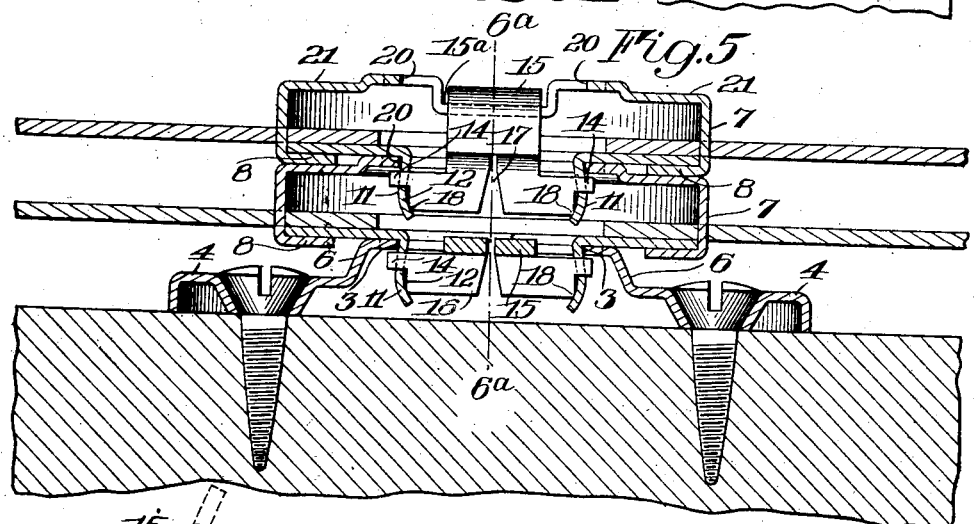
Fig. 5 is a sectional view taken in the plane of Fig. 4, with the actuating lever shown in locking position, and illustrating the application of the invention to a plurality of fastening devices, nested one upon the other.

Figs. 5 and 6 illustrate a slightly modified use of the improvement in which one fastener may be nested upon another, and in such case, it will be seen that the opening 13 in the plate 7 affords locking shoulders, designated at 20 in Fig. 5, to receive the coöperating locking lugs upon the adjacent member, and this is sometimes desirable where it is necessary to fasten two or three plies of material, one upon the other. The plate 7 is provided with depressed portions or recesses 21 which, together with the space above the finger piece 15, when the latter is in locked position, receive the lugs 8 of the coöperating fastener member, when two or more fasteners are nested.

I claim as my invention:

1. A fastening device comprising a pair of separable members, one of which is recessed and provided with a plurality of locking shoulders and the other of which carries a plurality of retaining members engageable in said recess, and a pivoted actuating lever controlling said retaining members and acting when turned about its axis to move them into engagement with the locking shoulders.

2. A fastening device comprising a pair of separable members, one of which is recessed and provided with a plurality of locking shoulders and the other of which carries a plurality of retaining members, and a pivoted actuating lever controlling said retaining members and acting when turned about its axis to move them so as to engage with the locking shoulders.

3. A fastening device comprising a pair of separable members, one of which is recessed and provided with a plurality of locking shoulders and the other of which carries a plurality of oppositely disposed retaining members, and a pivotally mounted actuating lever coöperating with said retaining members when moved to spread them apart so as to engage the locking shoulders.

4. A fastening device comprising a pair of separable members, one of which is recessed and provided with a plurality of locking shoulders, and the other of which carries a plurality of oppositely disposed retaining members, and a pivoted actuating lever having cam surfaces controlling the retaining members acting when the lever is turned about its axis to move the retaining members into engagement with said shoulders.

5. A fastening device comprising a pair of separable members, one of which is recessed and provided with a plurality of locking shoulders and the other of which carries a plurality of resilient lugs which are engageable in said recess, and an actuating lever coöperating with said lugs to move them into engagement with said shoulders.

6. A fastening device comprising a pair of separable members, one of which is recessed and provided with a plurality of locking shoulders and the other of which carries a plurality of resilient lugs which are engageable in said recess, and a pivoted actuating lever held frictionally in locking position and having cam surfaces acting to move the lugs into engagement with said shoulders.

7. A fastening device comprising a pair of separable members, one of which is recessed and provided with a plurality of locking shoulders and the other of which carries a plurality of resilient lugs which are engageable in said recess, and having their outer ends bent inwardly toward each other affording cam faces, and an actuating lever having edges which engage said cam faces on the lugs and spread the lugs apart to engage said shoulders.

8. A fastening device comprising a pair of separable members, one of which is recessed and provided with a plurality of locking shoulders and the other of which carries a plurality of resilient lugs which are engageable in said recess and having their outer ends bent inwardly toward each other affording cam faces, and an actuating lever pivoted in bearings in said lugs and having extensions affording cam surfaces for engagement with said cam faces on the lugs.

9. A fastening device comprising a pair of separable members, one of which is recessed and provided with a plurality of locking shoulders and the other of which carries a plurality of resilient lugs which are engageable in said recess, and having their outer ends bent inwardly toward each other affording cam faces, and an actuating lever pivoted in bearings in said lugs and having a projecting flange affording cam surfaces at its ends for engagement with said cam faces on the lugs, and cut away at its central portion to permit slight yielding of the cam surfaces toward each other.

10. A fastening device comprising a pair of separable members, both of which are recessed, the one having a plurality of locking shoulders, and the other having a pair of oppositely disposed resilient lugs, and a pivoted actuating lever extending through the recess in the last mentioned member and having cam surfaces for engagement with the lugs, and a finger piece on the lever.

11. A separable fastener member having a recess affording locking shoulders, a pair of oppositely disposed resilient retaining lugs, and an actuating lever having cam surfaces arranged to engage and spread said lugs.

12. A separable fastener member having a recess affording locking shoulders at one side, resilient retaining lugs on the other side, and an actuating lever extending through said recess having cam surfaces engaging said lugs and a finger piece arranged to lie adjacent to said locking shoulders when in locking position.

13. A fastening device comprising a pair of separable members, one of which is recessed and provided with a plurality of locking shoulders and the other of which carries a plurality of resilient retaining members, and an actuating lever coöperating with said retaining members and operable to move them into engagement with said shoulders.

14. A fastening device comprising a pair of separable members, one of which is recessed and provided with a plurality of locking shoulders and the other of which carries a plurality of resilient retaining members, cam faces on the retaining members, and a pivoted actuating lever having cam surfaces arranged to engage the cam faces on the retaining members and spread the latter so as to engage said shoulders.

EMIL LUDEKE.

Copies of this patent may be obtained for five cents each, by addressing the "Commissioner of Patents, Washington, D. C."